(12) United States Patent
Swett

(10) Patent No.: US 8,441,889 B2
(45) Date of Patent: May 14, 2013

(54) SELF-STABILIZING DYNAMIC DIAPHRAGM FOR BROAD BANDWIDTH ACOUSTIC ENERGY SOURCE

(75) Inventor: Dwight W. Swett, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 335 days.

(21) Appl. No.: 12/816,452

(22) Filed: Jun. 16, 2010

(65) Prior Publication Data

US 2010/0315899 A1 Dec. 16, 2010

Related U.S. Application Data

(60) Provisional application No. 61/187,430, filed on Jun. 16, 2009.

(51) Int. Cl.
*G01V 1/00* (2006.01)
*G01V 1/40* (2006.01)
*E21B 47/10* (2012.01)

(52) U.S. Cl.
USPC ............. 367/35; 367/911; 73/152.37; 702/6

(58) Field of Classification Search .................. 367/35, 367/911, 25–34, 81–86, 163, 174, 175; 73/152.37; 702/6
See application file for complete search history.

(56) References Cited

U.S. PATENT DOCUMENTS

| | | | |
|---|---|---|---|
| 1,507,171 A | * | 9/1924 | Hahnemann et al. ......... 367/175 |
| 3,292,143 A | * | 12/1966 | Russell ............................ 367/30 |
| 3,482,062 A | * | 12/1969 | Hecht ............................. 381/162 |
| 4,047,060 A | | 9/1977 | Schafft |
| 4,353,122 A | | 10/1982 | Cubberly |
| 4,768,615 A | | 9/1988 | Steinebrunner et al. |
| 5,063,542 A | | 11/1991 | Petermann et al. |
| 5,313,025 A | | 5/1994 | Roessler |
| 5,600,610 A | | 2/1997 | Hill |
| 6,909,666 B2 | | 6/2005 | Dubinsky et al. |
| 2004/0032957 A1 | | 2/2004 | Mansy et al. |

FOREIGN PATENT DOCUMENTS

WO WO 2009082060 A1 * 7/2009

OTHER PUBLICATIONS

Eugenio Lo Piccolo et al., "Corrosion and Environmental Cracking Evaluation of High Density Brines for Use in HPHT Fields"; Society of Petroleum Engineers, SPE Paper No. 97593; May 17-19, 2005.
Notification of Transmittal of the International Search Report and the Written Opinion of the International Searching Authority, or the Declaration; PCT/US2011/029624; Nov. 28, 2011.
Notification of Transmittal of the International Search Report and the Written Opinion of the International Searching Authority, or the Declaration; PCT/US2010/038826; Feb. 21, 2011.

* cited by examiner

*Primary Examiner* — Cassie Galt
(74) *Attorney, Agent, or Firm* — Cantor Colburn LLP

(57) ABSTRACT

An apparatus for estimating a property in a borehole penetrating the earth, the apparatus having: a carrier configured to be disposed in the borehole; and an acoustic transducer disposed at the carrier and configured to at least one of transmit and receive an acoustic wave used to estimate the property, the acoustic transducer comprising an acoustic diaphragm; wherein the acoustic diaphragm includes a surface in communication with a plurality of structural members configured to increase the rigidity of the surface, the surface being configured to interface with a medium that propagates the acoustic wave.

16 Claims, 11 Drawing Sheets

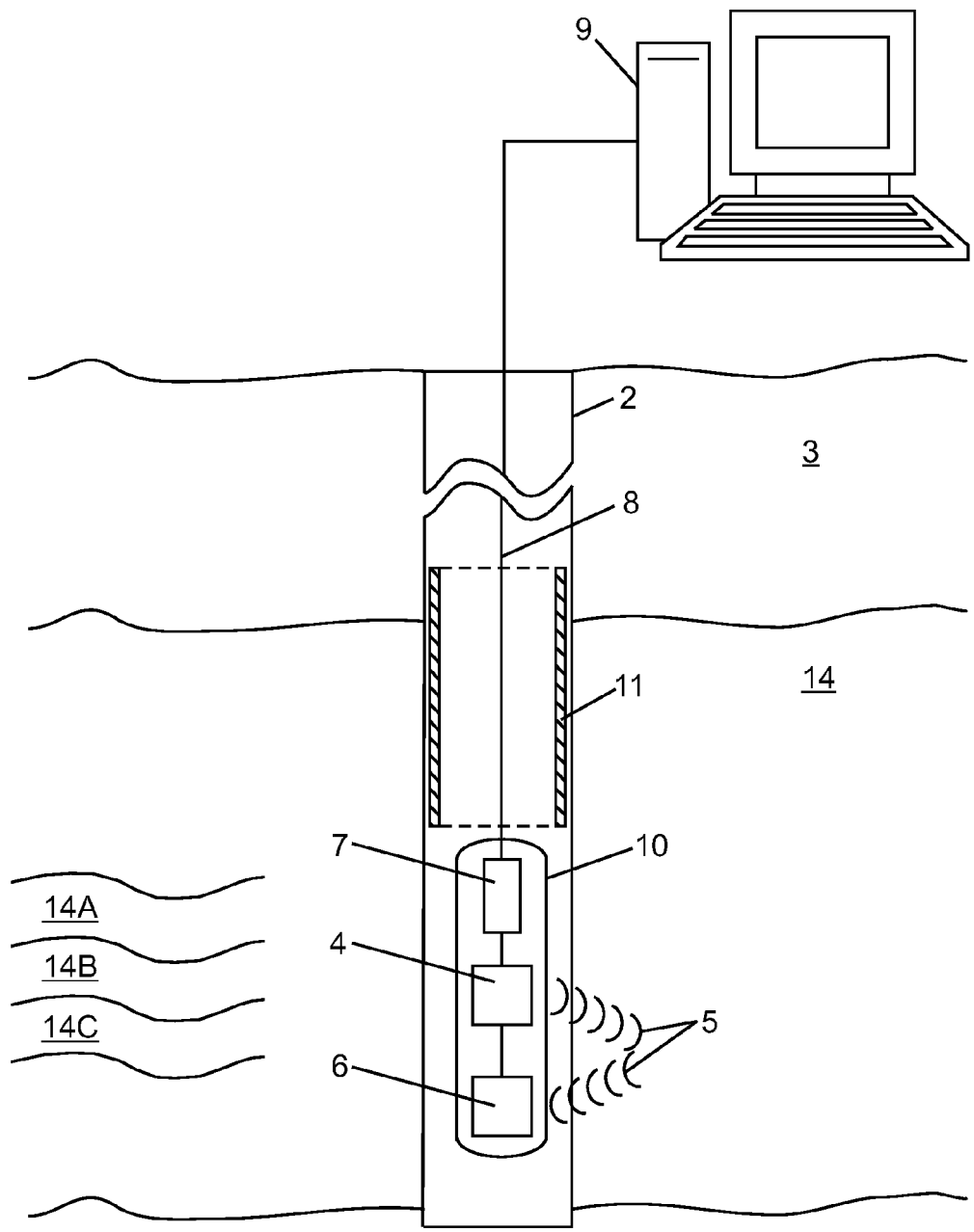

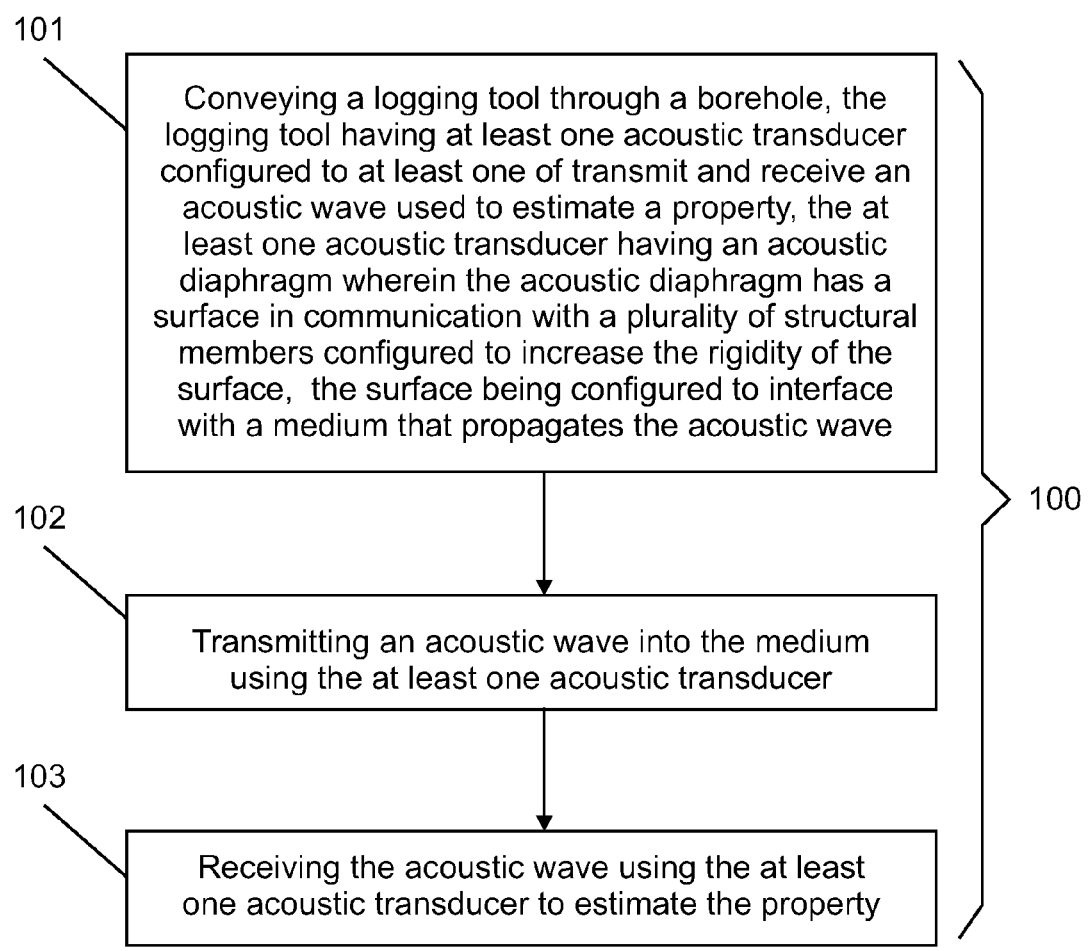

SELF-STABILIZING DYNAMIC DIAPHRAGM FOR BROAD BANDWIDTH ACOUSTIC ENERGY SOURCE

CROSS-REFERENCE TO RELATED APPLICATIONS AND PRIORITY CLAIM

This application claims the benefit of U.S. Provisional Application Ser. No. 61/187,430, entitled "SELF-STABILIZING DYNAMIC DIAPHRAGM FOR BROAD BANDWIDTH ACOUSTIC ENERGY SOURCE", filed Jun. 16, 2009, under 35 U.S.C. §119(e), which is incorporated herein by reference in its entirety.

BACKGROUND OF THE INVENTION

1. Field of the Invention

The invention disclosed herein relates to acoustic measurements and, in particular, to performing the measurements in a borehole.

2. Description of the Related Art

Exploration and production of hydrocarbons generally requires accurate and precise measurements of earth formations, which may contain reservoirs of the hydrocarbons. The reservoirs are accessed by drilling boreholes into the earth formations. Well logging is one technique used to perform the measurements from within the boreholes.

In one type of well logging referred to as wireline logging, a logging tool supported by an armored cable is conveyed through a borehole. The armored cable generally contains electrical cables for supplying power to the logging tool and communicating with the tool. The logging tool includes those components such as sensors and processors used to perform the measurements. As the logging tool is conveyed through the borehole, the measurements are performed at various depths. The measurements are associated with the depths at which they were performed and displayed as a log.

Various types of measurements can be made to produce a log. One type of measurement involves measuring the velocity of sound in an earth formation. Many characteristics of the earth formation such as type of a material, amount of a material, and porosity of a material can be estimated by knowing the velocity of sound in the earth formation as a function of depth.

For example, a sound wave may be emitted that penetrates the earth formation and is reflected back. If it is known that the earth formation is composed of a certain type of material and that the pore spaces of the material are filled with water, then it is possible to determine the porosity based on a measurement of the speed of the sound wave.

An acoustic logging tool is used to measure the velocity of sound downhole. In general, the acoustic logging tool includes at least one acoustic transmitter to emit a sound wave, at least one acoustic receiver to receive the sound wave, and a processor to process data from the tool to estimate the velocity of the sound wave. The transmitter and receiver may each be referred to as an acoustic transducer. A conventional acoustic transducer for use downhole operates over a range of about ten to fourteen kilohertz. Unfortunately, a wider range especially on the low side is more desirable for the many types of acoustic measurements that can be performed downhole.

Therefore, what are needed are techniques for transmitting and receiving a sound wave having a wide frequency range downhole. Preferably, the sound wave can cover the frequency range of one to fifteen kilohertz.

BRIEF SUMMARY OF THE INVENTION

Disclosed is a an apparatus for estimating a property in a borehole penetrating the earth, the apparatus having: a carrier configured to be disposed in the borehole; and an acoustic transducer disposed at the carrier and configured to at least one of transmit and receive an acoustic wave used to estimate the property, the acoustic transducer comprising an acoustic diaphragm; wherein the acoustic diaphragm includes a surface in communication with a plurality of structural members configured to increase the rigidity of the surface, the surface being configured to interface with a medium that propagates the acoustic wave.

Also disclosed is a method for estimating a property in a borehole penetrating the earth, the method including: conveying a carrier through the borehole, the carrier having at least one acoustic transducer configured to at least one of transmit and receive an acoustic wave used to estimate the property, the at least one acoustic transducer comprising an acoustic diaphragm wherein the acoustic diaphragm comprises a surface in communication with a plurality of structural members configured to increase the rigidity of the surface, the surface being configured to interface with a medium that propagates the acoustic wave; transmitting an acoustic wave into the borehole using the at least one acoustic transducer; and receiving the acoustic wave using the at least one acoustic transducer to estimate the property.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 1 illustrates an exemplary embodiment of an acoustic logging tool disposed in a borehole penetrating the earth;

FIG. 10 presents one example of a method for estimating a downhole property.

DETAILED DESCRIPTION OF THE INVENTION

Figure 2A:
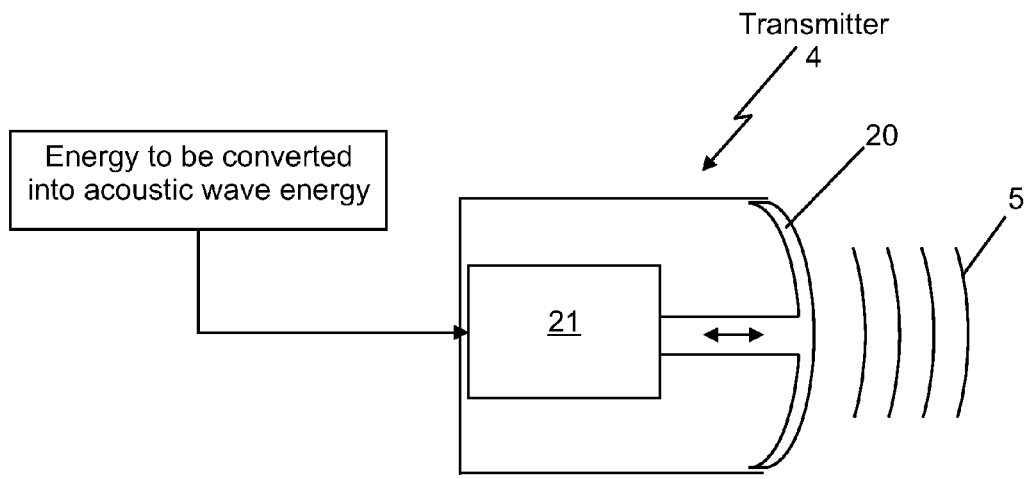
FIGS. 2A and 2B, collectively referred to as FIG. 2, depict aspects of an acoustic transducer.

Disclosed are exemplary embodiments of techniques for transmitting and receiving an acoustic wave having a wide frequency range. In particular, the transmitting and the receiving are performed in a borehole penetrating the earth. The wide frequency range, in general, extends at least from one to fifteen kilohertz for a frequency range of interest in the borehole. The techniques, which include apparatus and method, call for using an acoustic transducer for at least one of transmitting and receiving the acoustic wave with a light weight and rigid acoustic diaphragm. The acoustic diaphragm is a self-stabilizing dynamic structure having a broad frequency response. The frequency response of the acoustic diaphragm is generated by a relatively flat acoustic transfer function over the frequency range of interest with high acoustic energy output at low frequency and high frequency modes.

The light weight and rigid qualities of the acoustic diaphragm are achieved by using an acoustic surface that is stiffened by a plurality of structural members. In one embodiment, the structural members intersect to form geometric shapes (or cells) such as triangles. The geometric shapes maximize the rigidity of the surface while minimizing the dynamic mass of the acoustic diaphragm to customize the resonant frequency and modal deformation of the diaphragm surface for a specific bandwidth of frequency operation. In one embodiment, the acoustic diaphragm including the surface and the plurality of structural members is machined from one solid piece of material such as aluminum.

Reference may now be had to FIG. 1. FIG. 1 illustrates an exemplary embodiment of an acoustic logging tool 10 disposed in a borehole 2 penetrating the earth 3. The earth 3 can include a geologic formation 14 having layers such as 14A-14C. The logging tool 10 is supported in the borehole 2 by an armored cable 8. The armored cable 8 generally includes electrical power and signal cables for powering and communicating with the logging tool 10. The logging tool 10 includes an acoustic transmitter 4 (at least one) for transmitting an acoustic wave 5 and an acoustic receiver 6 (at least one) for receiving the acoustic wave 5. In general, the acoustic wave 5 is reflected back to the logging tool 10 by material in the formation 14.

Still referring to FIG. 1, the logging tool 10 includes an electronic unit 7 for operating the logging tool 10. Operation of the logging tool 10 can include operating the acoustic transmitter 4 and the acoustic receiver 6. In addition, the electronic unit 7 can receive and process or record data associated with measuring the speed of the acoustic wave 5. Alternatively, the electronic unit 7 can transmit the data for processing or recording to a processing system 9 at the surface of the earth 3.

Still referring to FIG. 1, a casing 11 may be disposed in the borehole 2. In this embodiment, the acoustic logging tool 10 may be used to monitor the casing 11 for corrosion, cracks and discontinuities. The logging tool 10 can monitor the casing 11 by using the acoustic wave 5 to measure a wall thickness of the casing 11.

While the acoustic logging tool 10 is conveyed by the armored cable 8 in the embodiment of FIG. 1, the logging tool 10 can also be conveyed by slickline or coiled tubing. In addition, the logging tool 10 can be conveyed by a drill string in embodiments known as logging-while-drilling (LWD) or measuring-while-drilling (MWD). In LWD/MWD applications, the acoustic logging tool 10 may be disposed in a drill collar. When used in the LWD/MWD applications, drilling may be temporarily halted to prevent vibrations while the logging tool 10 is performing a measurement.

Figure 2B:
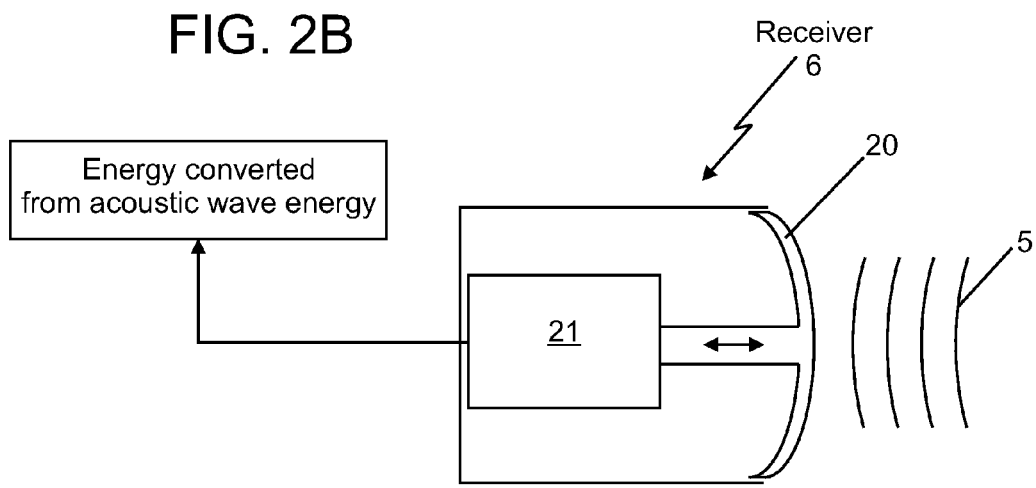

Reference may now be had to FIG. 2. FIG. 2A illustrates an exemplary embodiment of the acoustic transmitter 4. The acoustic transmitter 4 includes an acoustic diaphragm 20 configured to transmit the acoustic wave 5. The acoustic diaphragm 20 in FIG. 2A is coupled to a converter 21 that is configured to convert energy from the electronic unit 7 into the acoustic wave 5. FIG. 2B illustrates an exemplary embodiment of the acoustic receiver 6. The acoustic receiver 6 includes the acoustic diaphragm 20 configured to receive the acoustic wave 5. The acoustic diaphragm 20 in FIG. 2B is coupled to the converter 21 configured to convert the energy of the received acoustic wave 5 into signal energy transmitted to the electronic unit 7. While shown as separate units in FIGS. 1 and 2, the transmitter 4 and the receiver 6 can be combined into one unit, referred to herein as an acoustic transducer 4,6. For discussion purposes, the acoustic transducer 4,6 can refer to a transmitter, a receiver, or both.

Reference may now be had to FIG. 3. FIG. 3 depicts aspects of the acoustic diaphragm 20 by presenting several views of the diaphragm 20. FIG. 3A illustrates a horizontal side view of the acoustic diaphragm 20. Referring to FIG. 3A, the acoustic diaphragm 20 includes an acoustic surface 30 that is configured to interact with a medium, such as the a fluid disposed in the borehole 2, that transmits the acoustic wave 5. In one embodiment, the acoustic surface 30 is solid (i.e., having no openings). The acoustic diaphragm 20 also includes a plurality of structural members 31 configured to stiffen or increase the rigidity of the acoustic surface 30. In addition, the acoustic diaphragm 20 includes a mounting collar 32 configured to mount the diaphragm 20 to the converter 21.

Figure 3A:
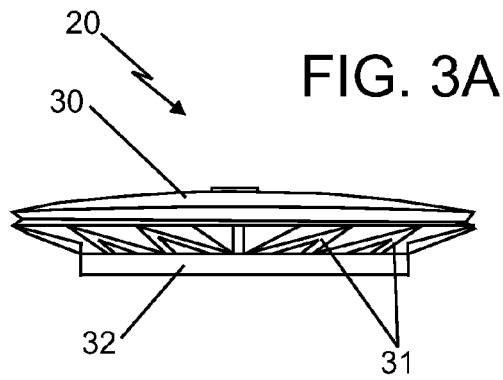
FIGS. 3A, 3B, 3C, and 3D, collectively referred to as FIG. 3, depict aspects of an acoustic diaphragm used in the acoustic transducer.
Figure 3D:
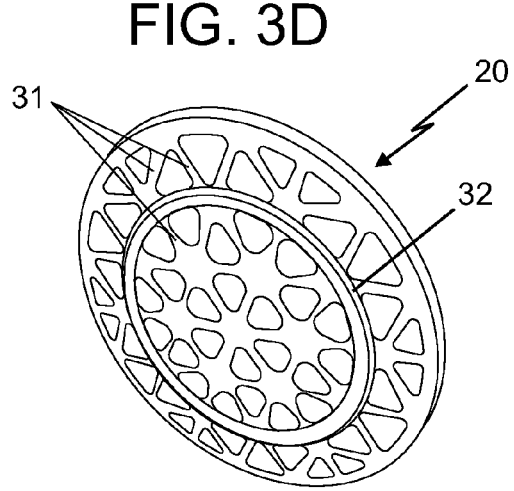
Figure 3B:
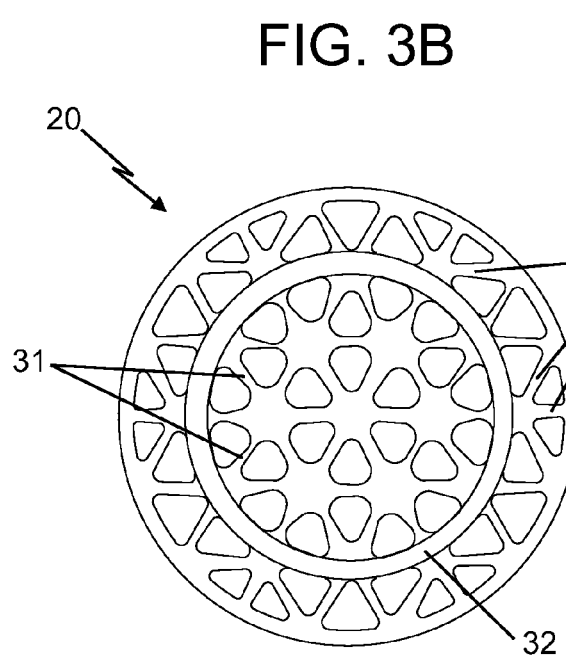
Figure 3C:
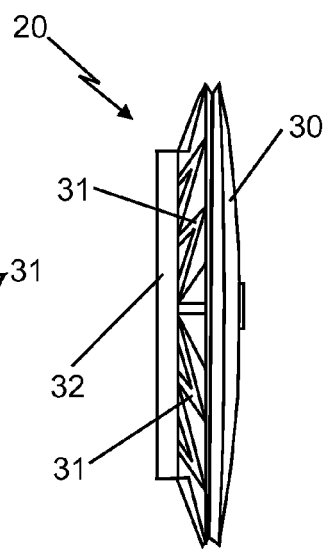

FIG. 3B illustrates a bottom view of the acoustic diaphragm 20. In the embodiment depicted in FIG. 3B, each structural member 31 intersects with another structural member 31 to form geometric shapes such as the triangles shown in FIG. 3B. FIG. 3C illustrates a vertical side view of the acoustic diaphragm 20. FIG. 3D illustrates a three-dimensional view of the acoustic diaphragm 20.

Figure 4A:
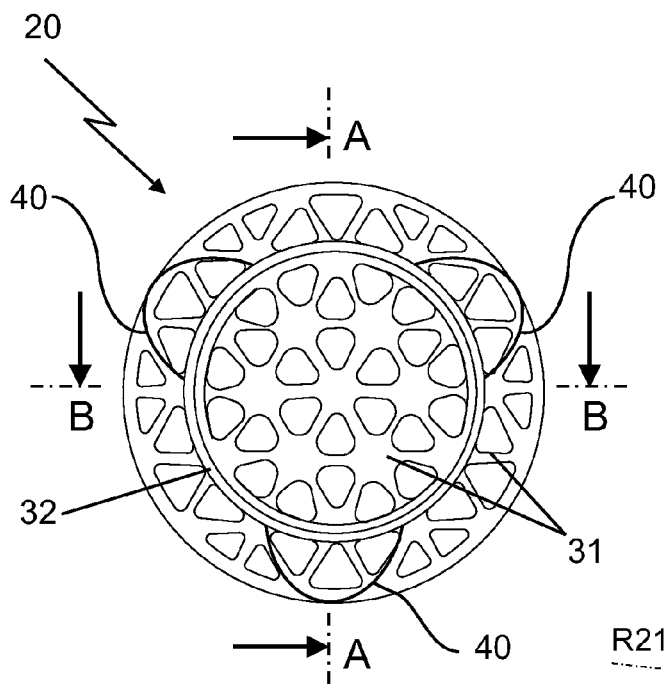
FIG. 4 A, 4B, and 4C, collectively referred to as FIG. 4, depict more aspects of the acoustic diaphragm.
Figure 4B:
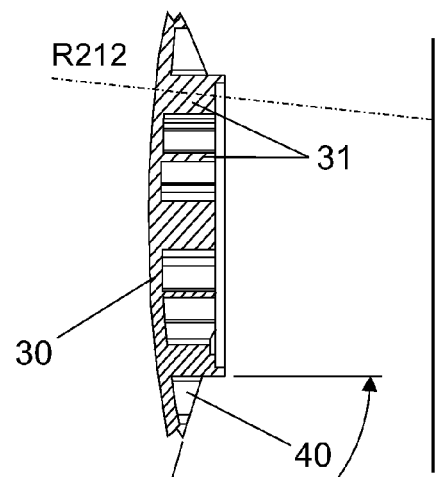
Figure 4C:
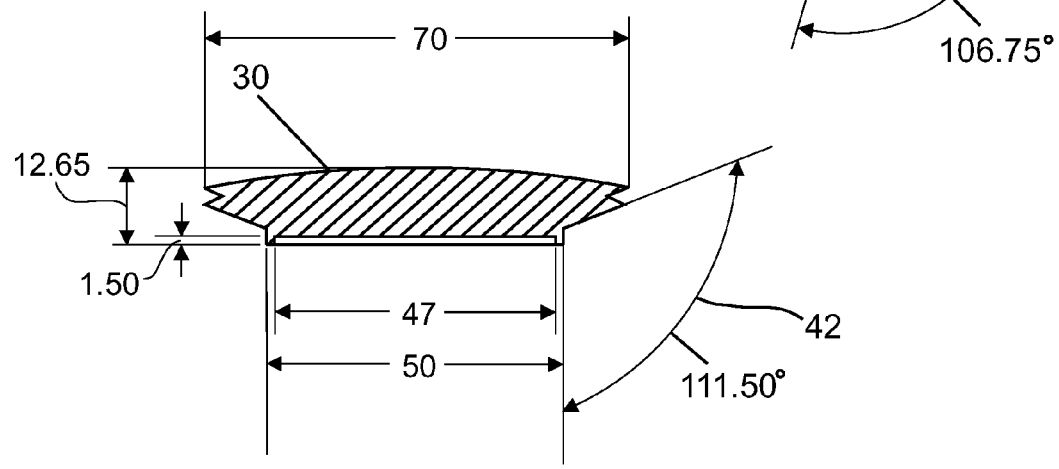

FIG. 4 depicts dimensions (in millimeters) and other aspects of one embodiment of the acoustic diaphragm 20. Referring to FIG. 4A, the acoustic diaphragm 20 includes a plurality of lobes 40. The plurality of lobes 40 is distinguished from structural members 31 between the lobes 40. The structural members between the lobes 40 form a first angle 41 with respect to the mounting collar 32 as shown in FIG. 4C. Each lobe 40 forms a second angle 42 with respect to the mounting collar 32 as shown in FIG. 2B. The plurality of lobes 40 optimizes the combination of stiffness to mass distribution to increase the bandwidth of the acoustic frequency response of the acoustic diaphragm 20.

Figure 5:
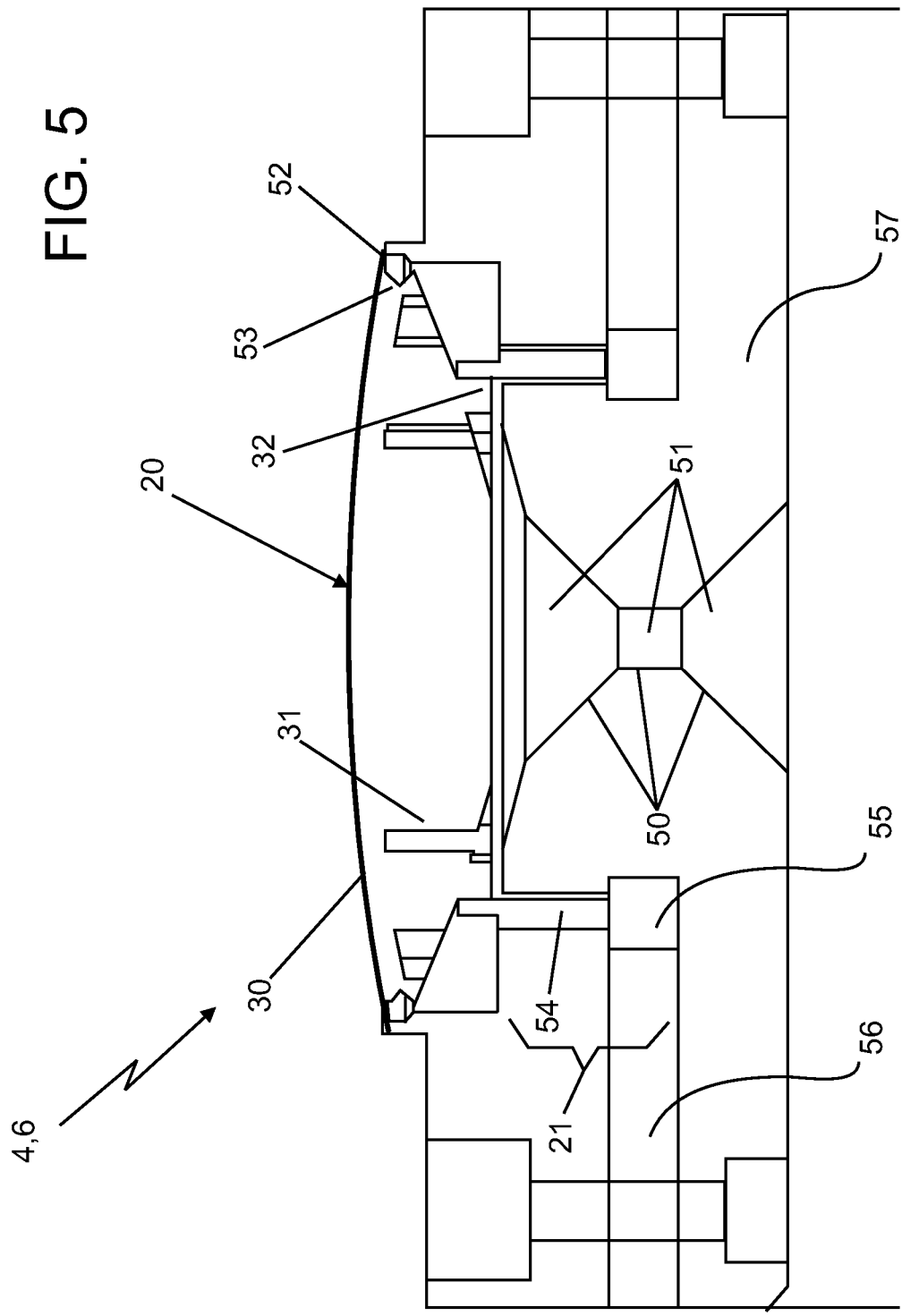
FIG. 5 illustrates a cross-sectional view of an exemplary embodiment of the acoustic transducer.

Reference may now be had to FIG. 5. FIG. 5 illustrates a cross-sectional view of an exemplary embodiment of the acoustic transducer 4,6. The acoustic transducer 4,6 in FIG. 5 includes a body 57 to which components such as the acoustic diaphragm 20 are attached. The body 57 includes a cavity 50, which contains an elastomeric fluid 51 such as silicone. The cavity 50 with the fluid 51 is used to improve the low frequency response of the transducer 4,6. In one embodiment, the fluid 51 is silicone having a low stiffness (Shore-A Hardness 5). This fluid 51 has the effect of lowering the acoustic roll-off frequency well below two kilohertz and, thereby, increasing acoustic output at the two kilohertz operating mode.

Still referring to FIG. 5, the converter 21 includes a coil 54 adjacent to a magnet 55 supported by support 56. The coil 54 and the magnet 55 in the embodiment of FIG. 5 are both circular shaped. For transmitting, an electrical signal sent to the coil 54 causes the coil 54 and the acoustic diaphragm 20 to move with respect to the magnet 55. For receiving, movement of the coil 54 with respect to the magnet 55 due to movement of the acoustic diaphragm 20 generates an electrical signal in the coil 54

The acoustic transducer 4,6 in the embodiment of FIG. 5 includes a seal 52 such as an O-ring to seal the acoustic diaphragm 20 to the body 57. The seal 52 seals the cavity 50 to prevent exposure of the fluid 51 to reactive mud chemicals while still allowing the diaphragm 20 to move relative to the body 57. The diaphragm 50 in one embodiment includes a groove 53, such as a V-shaped groove, to hold the seal 52.

Figure 6:
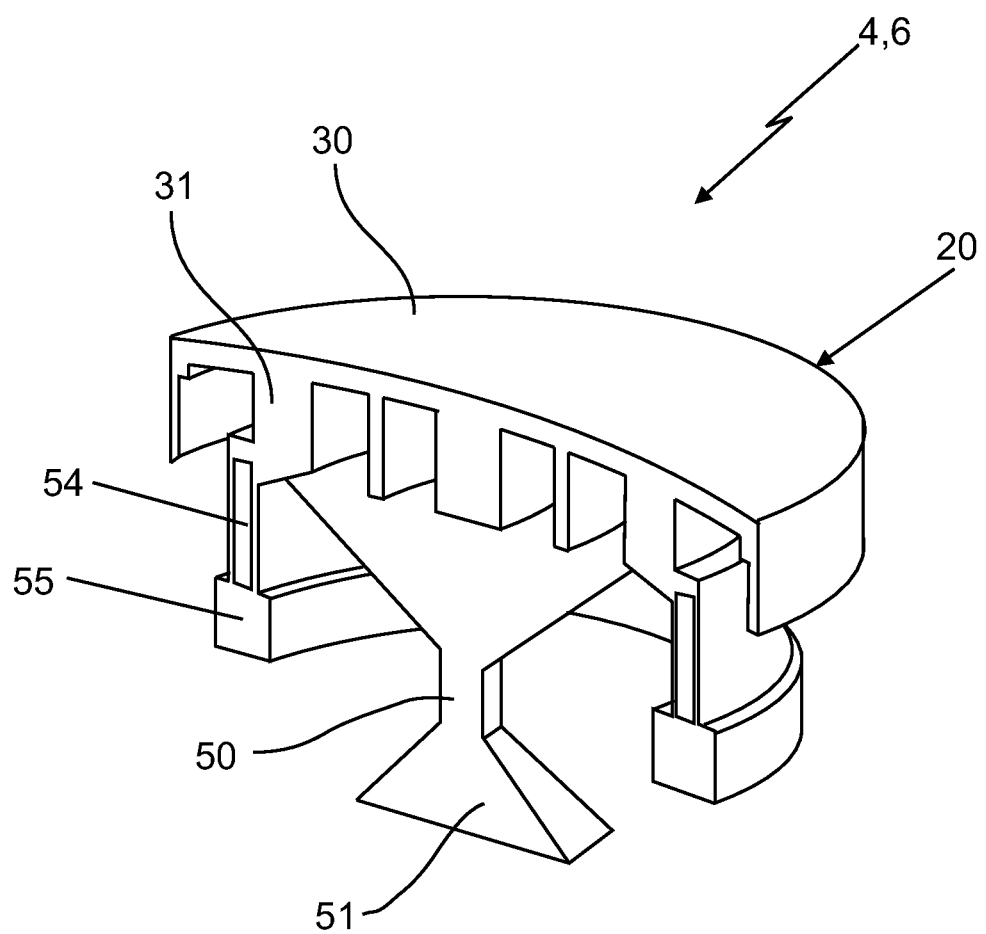
FIG. 6 illustrates a three-dimensional view of the acoustic sensor.

Reference may now be had to FIG. 6. FIG. 6 illustrates a cross-sectional three-dimensional view of the acoustic transducer 4,6.

Figure 7A:
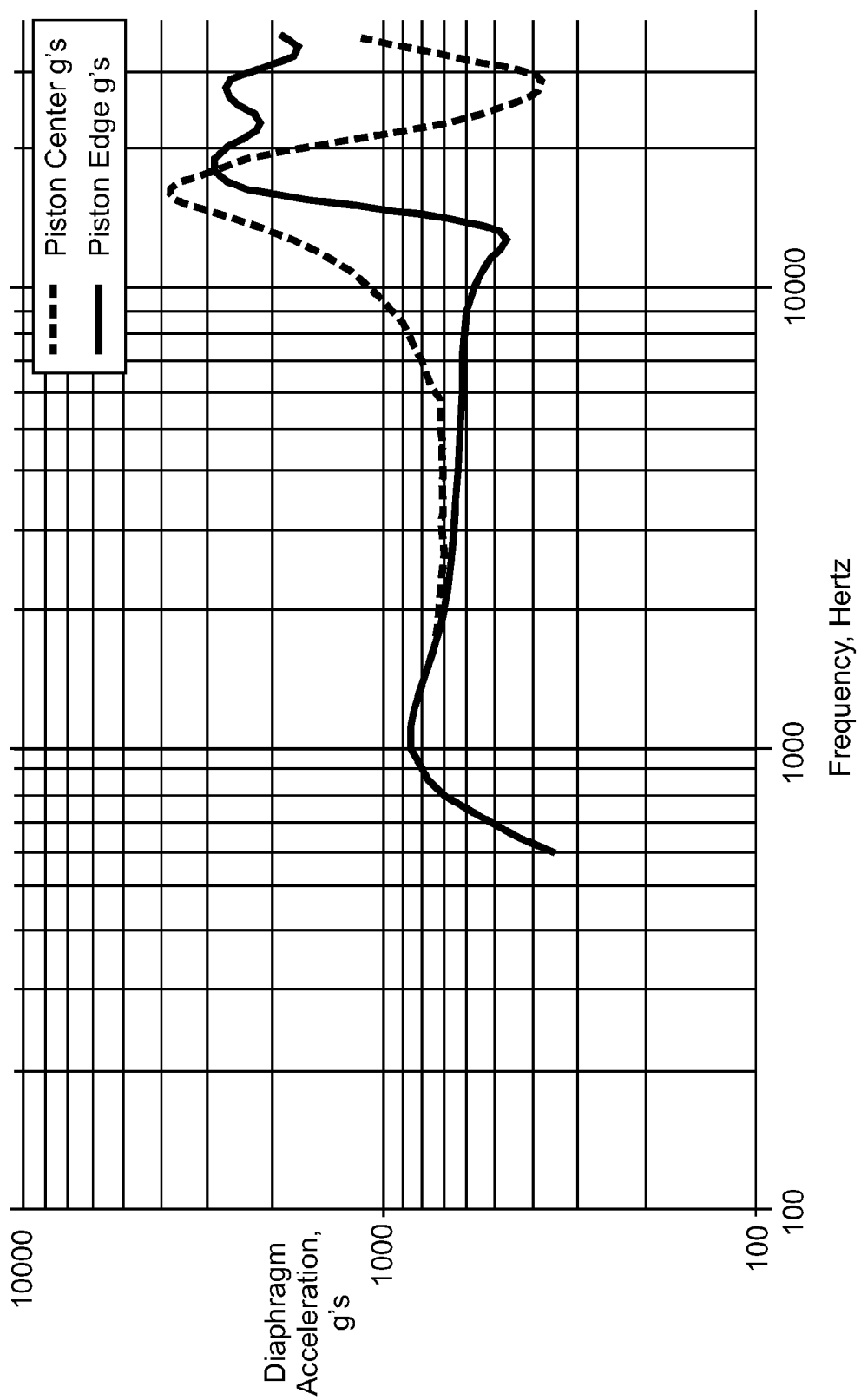
FIGS. 7A and 7B, collectively referred to as FIG. 7 depict aspects of frequency response of the acoustic diaphragm.
Figure 7B:
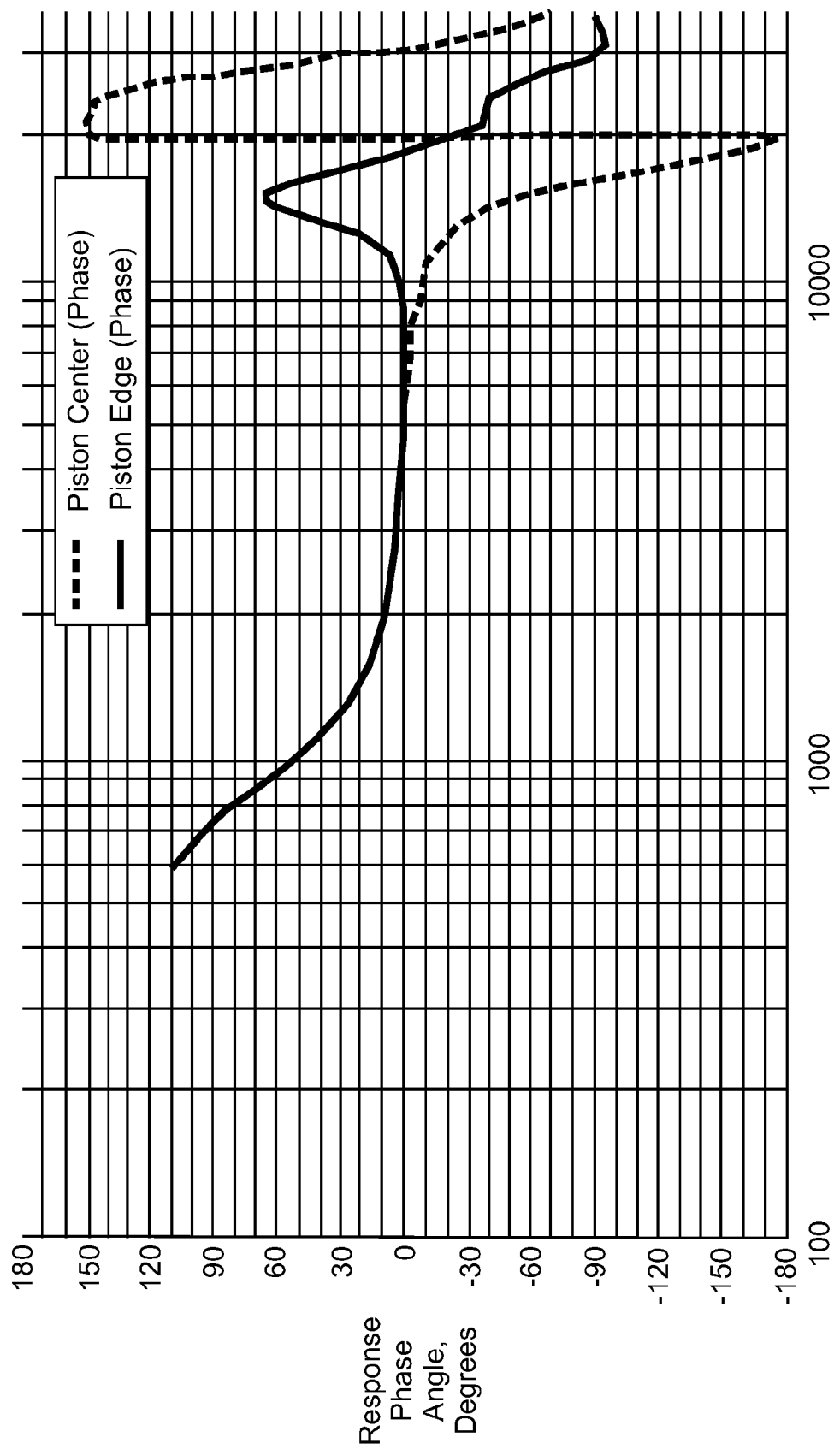
Figure 8:
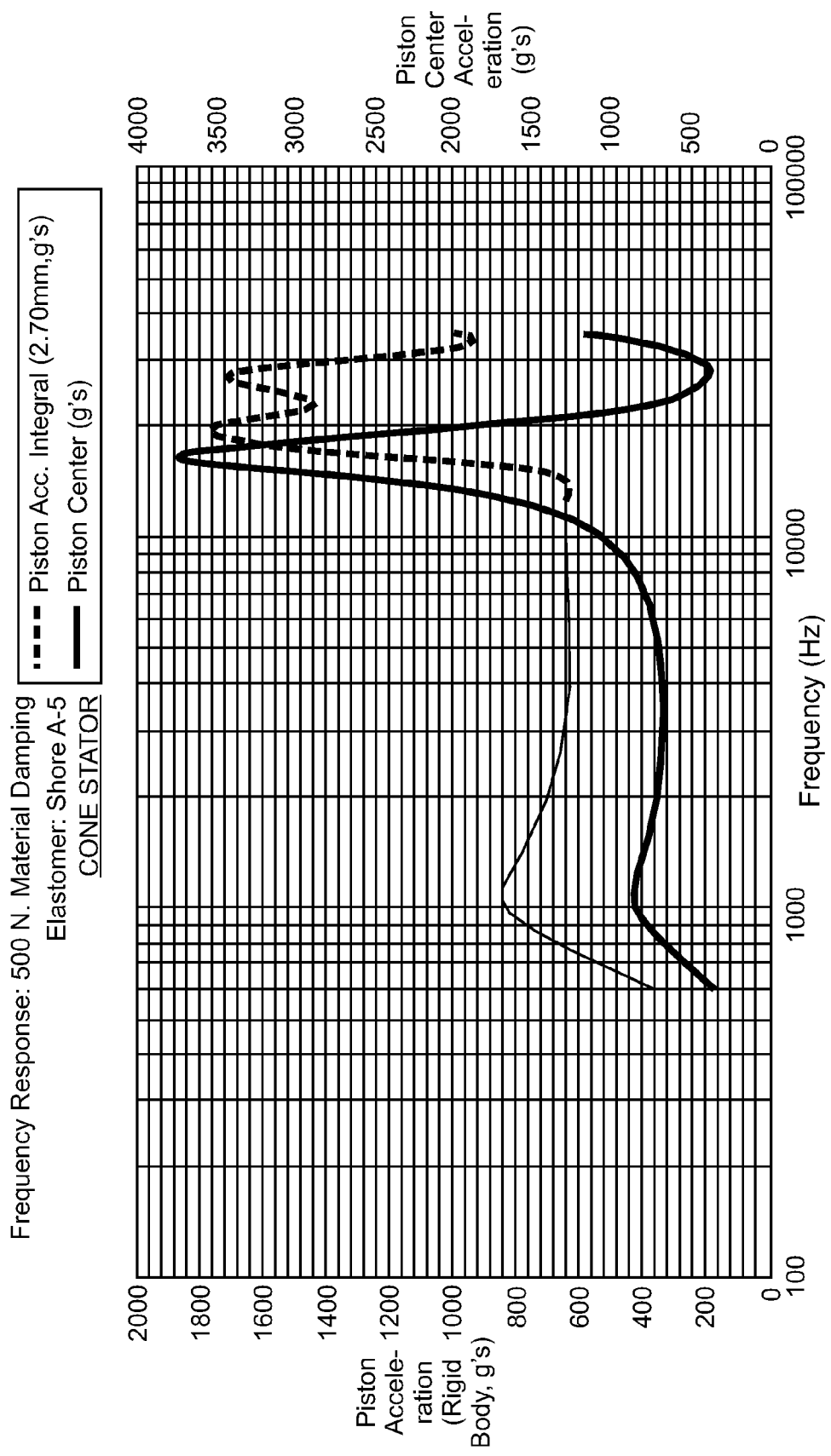
FIG. 8 depicts other aspects of the frequency response of the acoustic diaphragm.

A frequency response analysis of the acoustic diaphragm 20 was conducted using numerical simulation. The analysis simulated the diaphragm 20 shown in FIGS. 3-6 with the fluid 51 having the Shore A-5 characteristic. The results of the analysis are presented in FIGS. 7 and 8. FIG. 7A illustrates the acceleration of the diaphragm 20 versus frequency for an edge point and a center point. FIG. 7B illustrates the phase angle response of the diaphragm 20 versus frequency for the edge point and the center point. FIG. 8 illustrates the acceleration of the diaphragm 20 for the center point and the integral of the acceleration across the acoustic surface 30 versus frequency. The integral of the acceleration over the acoustic surface is a proportional parameter used to assess acoustic output pressure as function of frequency.

Figure 9:
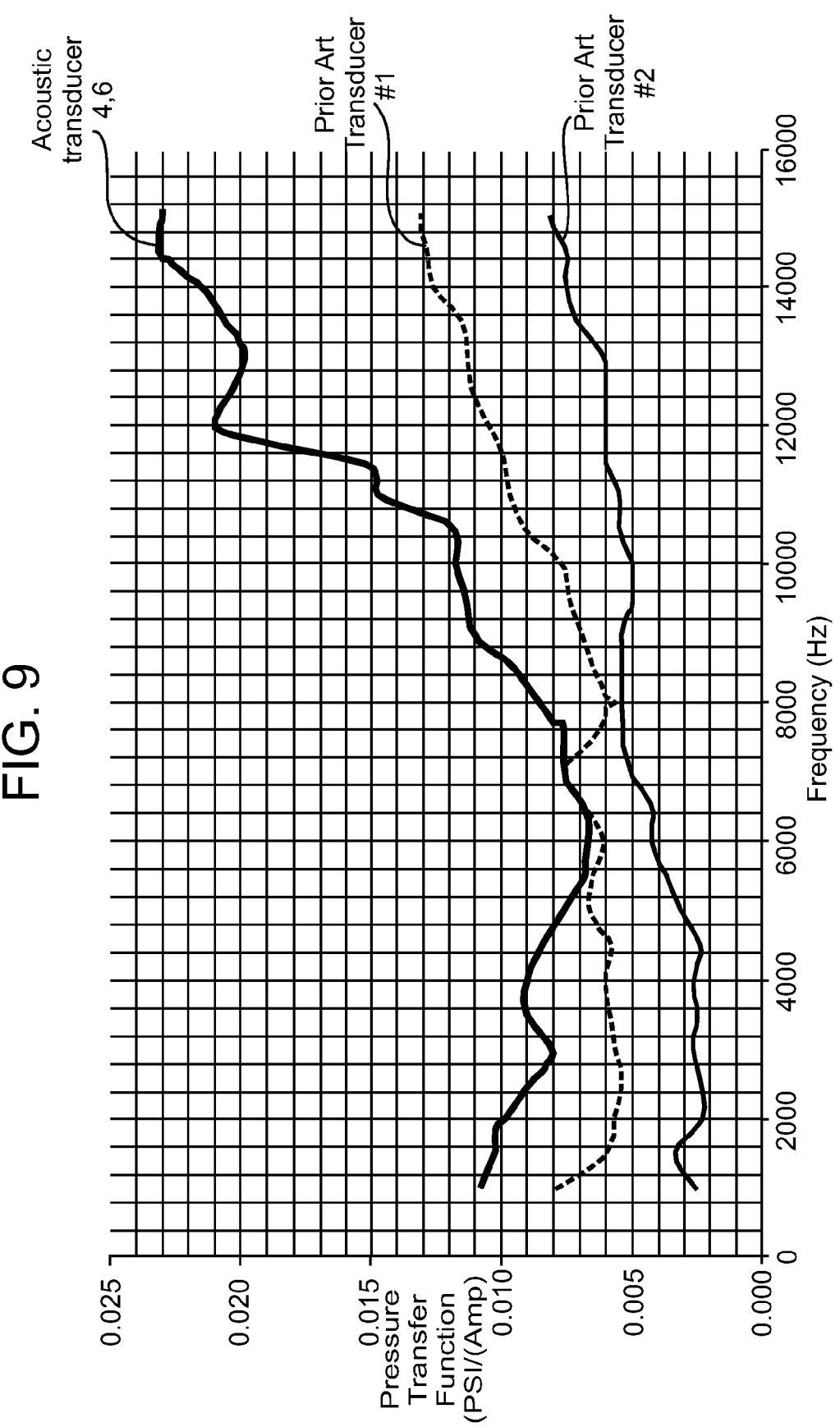
FIG. 9 depicts aspects of a pressure transfer function of the acoustic transducer in comparison to the pressure transfer function of two prior art acoustic transducers.

The acoustic transducer 4,6 having the diaphragm 20 shown in FIGS. 3-6 was tested in a water tank. Two prior art acoustic transducers were also tested for comparison purposes. FIG. 9 illustrates a pressure transfer function (in psi/ampere) versus frequency for the three acoustic transducers. The experimental data in FIG. 9 indicates that the acoustic transducer 4,6 when used as a transmitter generates approximately 4.2 times as much acoustic output pressure at the low frequency 2 kilohertz operating mode as the two prior art acoustic transducers. The experimental data also indicates that the acoustic transducer 4,6 when used as a transmitter generates approximately 3.4 times as much acoustic output pressure at the high frequency 12 kilohertz operating mode as the two prior art acoustic transducers.

FIG. 10 presents one example of a method 100 for estimating a property in the borehole 2 penetrating the earth 3. The method 100 calls for (step 101) conveying the acoustic logging tool 10 through the borehole 2. Further, the method 100 calls for (step 102) transmitting the acoustic wave 5 into the borehole 2 using the acoustic transducer 4,6. Further, the method 100 calls for (step 103) receiving the acoustic wave 5 using the acoustic transducer 4,6 to estimate the property.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof. The term "medium" relates to a material that propagates the acoustic wave 5. Non-limiting examples of the medium include any of or a combination of a fluid disposed in the borehole 2, the formation 14, and the casing 11.

In support of the teachings herein, various analysis components may be used, including a digital and/or an analog system. For example, the electronic unit 7 or the processing system 9 may included the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit, electromechanical unit, or mounting bracket may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property in a borehole penetrating the earth, the apparatus comprising:
  a carrier configured to be disposed in the borehole; and
  an acoustic transducer disposed at the carrier and configured to at least one of transmit and receive an acoustic wave used to estimate the property, the acoustic transducer comprising an acoustic diaphragm;
  wherein: the acoustic diaphragm comprises a surface in communication with a plurality of structural members configured to increase the rigidity of the surface, the surface being configured to interface with a medium that propagates the acoustic wave; the surface comprises a circular shape; the acoustic diaphragm comprises a mounting ring disposed concentrically to the surface and configured to mount the acoustic diaphragm to a converter configured to at least one of convert energy into movement of the diaphragm and convert movement of the diaphragm into energy; at least one member in the plurality of structural members is disposed between the mounting ring and a perimeter of the surface; the at least one member forms a first angle between the mounting ring and the perimeter of the surface; and the acoustic diaphragm comprises a plurality of lobes spaced about the perimeter of the diaphragm, each lobe forming a second angle between the mounting ring and the perimeter of the surface, the second angle being configured to increase a rigidity to mass distribution ratio.

2. The apparatus of claim 1, wherein the converter comprises a coil in electromagnetic communication with a magnet, the coil being configured to at least one of receive energy to move the diaphragm and transmit energy from the movement of the diaphragm.

3. The apparatus of claim 2, wherein the coil and magnet are disposed concentrically to the surface of the acoustic diaphragm.

4. The apparatus of claim 1, wherein the first angle is 111.5 degrees and the second angle is 106.75 degrees.

5. The apparatus of claim 1, wherein the structural members intersect with each other to form a geometric shape.

6. The apparatus of claim 5, wherein the geometric shape comprises a triangle.

7. The apparatus of claim 6, wherein surface interior to the triangle is curved at an intersection of two of the structural members.

8. The apparatus of claim 1, wherein the acoustic transducer comprises an elastomer material disposed in a cavity and in communication with the acoustic diaphragm.

9. The apparatus of claim 8, wherein the elastomer material is silicone.

10. The apparatus of claim 1, wherein the acoustic diaphragm is machined from one piece of material.

11. The apparatus of claim 10, wherein the material is aluminum.

12. The apparatus of claim 1, wherein the property is of a formation penetrated by the borehole and is at least one selection from a group consisting of type of material, amount of material, porosity, and a boundary between layers.

13. The apparatus of claim 1, wherein the property is of a material disposed in the borehole.

14. A method for estimating a property in a borehole penetrating the earth, the method comprising:
conveying a carrier through the borehole, the carrier comprising at least one acoustic transducer configured to at least one of transmit and receive an acoustic wave used to estimate the property, the at least one acoustic transducer comprising an acoustic diaphragm wherein: the acoustic diaphragm comprises a surface in communication with a plurality of structural members configured to increase the rigidity of the surface, the surface being configured to interface with a medium that propagates the acoustic wave; the surface comprises a circular shape; the acoustic diaphragm comprises a mounting ring disposed concentrically to the surface and configured to mount the acoustic diaphragm to a converter configured to at least one of convert energy into movement of the diaphragm and convert movement of the diaphragm into energy; at least one member in the plurality of structural members is disposed between the mounting ring and a perimeter of the surface; the at least one member forms a first angle between the mounting ring and the perimeter of the surface; and the acoustic diaphragm comprises a plurality of lobes spaced about the perimeter of the diaphragm, each lobe forming a second angle between the mounting ring and the perimeter of the surface, the second angle being configured to increase a rigidity to mass distribution ratio;
transmitting an acoustic wave into the borehole using the at least one acoustic transducer; and
receiving the acoustic wave using the at least one acoustic transducer to estimate the property.

15. The method of claim 14, wherein the acoustic wave comprises a frequency from a range consisting of one to fifteen kilohertz.

16. The method of claim 14, wherein the method is implemented using a computer program product stored on non-transitory machine-readable media.

* * * * *